(12) United States Patent
Brown

(10) Patent No.: US 9,303,681 B1
(45) Date of Patent: Apr. 5, 2016

(54) RETAINER APPARATUS

(71) Applicant: Clinton D. Brown, Denver, CO (US)

(72) Inventor: Clinton D. Brown, Denver, CO (US)

( * ) Notice: Subject to any disclaimer, the term of this patent is extended or adjusted under 35 U.S.C. 154(b) by 0 days.

(21) Appl. No.: 14/569,630

(22) Filed: Dec. 13, 2014

(51) Int. Cl.
| | |
|---|---|
| *F16B 45/00* | (2006.01) |
| *B66C 1/34* | (2006.01) |
| *F16B 45/02* | (2006.01) |
| *B66C 1/36* | (2006.01) |
| *B63B 21/54* | (2006.01) |
| *B60D 1/28* | (2006.01) |

(52) U.S. Cl.
CPC ............. *F16B 45/025* (2013.01); *B60D 1/28* (2013.01); *B63B 21/54* (2013.01); *B66C 1/36* (2013.01); *F16B 45/02* (2013.01)

(58) Field of Classification Search
CPC ............ B63B 21/54; B66C 1/32; B66C 1/34; B66C 1/36; B60D 1/28; F16B 45/00; F16B 45/02
USPC .............. 24/298, 600.1, 599.4; 254/402, 406; 248/322, 339, 341, 301, 298; 294/82.2
See application file for complete search history.

(56) References Cited

U.S. PATENT DOCUMENTS

| | | | | |
|---|---|---|---|---|
| 5,127,219 | A * | 7/1992 | Herron | B60D 1/28 24/599.4 |
| 5,913,479 | A * | 6/1999 | Westwood, III | B66C 1/36 24/298 |
| 6,450,558 | B1 * | 9/2002 | Ringrose | B63B 21/54 24/600.1 |
| 7,669,835 | B2 * | 3/2010 | Thompson | F16B 45/00 254/402 |
| 8,746,766 | B2 * | 6/2014 | Lewkoski | B66C 1/36 294/33 |

* cited by examiner

*Primary Examiner* — Tan Le
(74) *Attorney, Agent, or Firm* — Roger A. Jackson

(57) ABSTRACT

A retainer apparatus for removably engaging a first article to a second article, the apparatus including a beam with a first end having an eyelet plus an open ended hook and a second end having a cavity. Operationally, the eyelet is pivotally attached the first article, thus the open ended hook is solely removably engagable with the second article. Also, a flexible finger extension constructed of an elongated element to form an open ended perimeter that closes the hook, wherein the elongated element terminates in a primary end portion pivotally connected to the first end, going to a perimeter section, and terminates in an opposing secondary end that is pivotally connected to the first end. Wherein operationally, the finger is urged to close the hook retaining the second article and the finger can be manually opened to release the second article with the cavity moved away from the second article.

2 Claims, 14 Drawing Sheets

RETAINER APPARATUS

RELATED PATENT APPLICATION

There are no related applications.

TECHNICAL FIELD

This invention relates generally to retaining unitary hook type load-bearing supports, and more particularly, it relates to retaining unitary hook type load bearing supports that are designed to be swingably suspended to hold a load in a first stable position, and, when desired, to be rotated to easily release such a load while placing the retainer into an open state.

BACKGROUND OF INVENTION

It has always been a challenge for a hunter harvesting large game to process a downed animal. Processing typically includes transporting the animal carcass back to camp, hanging the entire animal from a tree or other overhead support in order to clean it, and then to cool it down out of reach of predators. Eventually the hanging animal carcass is lowered for further dressing, butchering and removal from the camp site. The challenges faced in raising and lowering a large animal carcass and in then releasing it from its hanger are considerable. Similarly, raising and lowering a side of beef or pork waiting for processing in a commercial meat packinghouse, in a game processing plant, or in a private butcher shop presents comparable challenges as at a hunter's campsite. Heretofore, there have been load-bearing hooks designed especially for use in carrying a side of meat or freshly harvested large game animals.

Looking toward the prior art in U.S. Pat. No. 5,415,450 to Faxon, disclosed is a load lifting hook construction that is equipped with a control eye that is attachable to a control rope that parallels a suspension rope. In Faxon, a person located above the lifting hook can selectively pull the suspension rope and control the rope to manipulate the hook into, or out of, engagement with the load via pivoting at the main hook support eye 12. The tip of the hook in Faxon is spaced a relatively great distance from the suspension axis so that the hook has a relatively large mouth, see FIGS. 1 and 2, wherein also the hook is also enabled to extend into relatively small openings in the load to be lifted. With Faxon a variety of different types of loads can be remotely controlled and lifted, using the hook structure of this invention.

Continuing in the prior art in U.S. Pat. No. 5,676,084 to Palmer, et al., disclosed is a retrievable boat mooring device for reversible attachment to an off-shore oil platform. The mooring device in Palmer includes a modified U-shaped hook, one end of which is attached to a cable. A tubular Nylon rope in Palmer is attached to the other end of the hook, and the cable and the rope are attached to one another. The free end of the cable in Palmer terminates in a loop for grasping and pulling the cable. The mooring device in Palmer is secured to the platform by casting the hook over a stationary elongated horizontal support, and is retrieved by pulling on the cable loop, thereby drawing the hook over and away from the stationary horizontal support, see FIGS. 1 and 2. The advantage of Palmer over the present state of the art is that it enables one to tie a boat to and untie a boat from an off-shore oil platform without having to come dangerously near the platform.

Further, in the prior art in U.S. Pat. No. 7,052,057 to Hiles, disclosed is a dragging and gaffing device for dragging a game animal and for gaffing a fish or marine animal, that includes a hook member configured in a predetermined shape having a tapered end portion and a second end portion. The hook member in Hiles is provided with a predetermined opening between the tapered end portion and the second end portion, further a flexible strap member is operably connectable to the hook member so that the strap member serves as a handle and an attachment to connect the hook member to an external pulling mechanism, see FIGS. 2-7. In Hiles, the device distributes the weight of the game animal or the fish or marine animal to the ground requiring little or no lifting, see column 1, lines 29-40.

Next, in the prior art in U.S. Pat. No. 4,004,770 to Karass, disclosed is a hook and a hook assembly adapted in particular to suspend a meat carcass using a sling made of band type material. The hook in Karass includes a body having a suspending portion and a hooking portion defining a "J" form configuration, a horizontally extending flat portion to flatly receive the sling, a protruding lip portion extending from the suspending portion and defining a lower straight edge overlying the flat portion, and disposed below the tip of the hooking portion defining a spacing between the suspending and hooking portions which is smaller than the width of the band material to prevent the sling from jumping off from the hook, see FIGS. 1 and 2 in particular.

Also, in the prior art in U.S. Pat. No. 4,182,004 to Haring, Jr., et al., disclosed is an improved one-piece thermoplastic meat hook for use in carrying meat products such as beef, pork, etc. The meat hook in Haring is a single molded piece of plastic formed by injection molding and characterized by having an annular cross section with reinforcing stiffening ribs around semicircular end portions and along the length thereof for increasing the amount of tensional load that can be placed thereon, see FIGS. 1 to 7.

In addition, in the prior art in Japanese Publication Number 02-198998 to Hisato, disclosed is a slip off hook (1) designed for un hooking loads by using two cables, being a suspending member (c) connected to a winch and a hook tilting member (d), for releasing the load with human intervention, i.e. the hook is underwater, see section A prior art paragraph. Hisato also has a slip off prevention tool (3) that includes a freely movable weight (8) inside a cylinder (6) that is pivotally attached at (5) being operational to pivot to positively close the hook (1) at the hook mouth (2) as shown in FIG. 1, and in reverse to allow removal of the load (a) sling (b) at the hook mouth (2) as shown in FIGS. 2 and 3. This occurs in Hisato as the weight (8) slides within the cylinder (6) forcing the tool (3) to pivot or swivel at (5) when member (d) is pulled as shown in FIGS. 2 and 3, also see section 3 in the problems the invention attempts to solve paragraph. All the aforementioned components in Hisato require gravity to work, such that the hook goes from the state shown in FIG. 1 to as shown in FIGS. 2 and 3.

Accordingly, there exists a need for a retainer apparatus designed to be swingably suspended to hold a load in a first stable position with an automatic retainer to hold the load on the hook, and when desired, the retainer apparatus to be selectably rotated to release the load from the hook while manually retracting the automatic retainer.

SUMMARY OF INVENTION

A retainer apparatus for removably engaging a first article to a second article, the second article having an aperture therethrough, the apparatus including a beam having a longitudinal axis, the beam including a first end portion and an opposing second end portion, wherein the longitudinal axis spans therebetween the first end portion and the second end portion. The first end portion is affixed as an open ended hook, the hook being defined by an inside surface forming a void, wherein the hook has a cantilever section terminating in a tip end portion and an opposing extension arm terminating in an eyelet with a partial peripheral margin. The eyelet facilitates a first pivotal movement about a first pivotal axis that is perpendicular to the longitudinal axis.

Wherein operationally, the eyelet is pivotally attached the first article, thus the open ended hook is solely removably engagable with the second article aperture via a slidable contact with the inside surface to be within the void, the beam second end portion terminating in a second end distal portion.

Further included in the retainer apparatus is a flexible finger extension constructed of an elongated element that is bent to form an open ended perimeter, wherein the elongated element terminates in a primary end portion, going to a perimeter section, and terminates in an opposing secondary end portion. Wherein the primary and secondary end portions overlap one another and are capable of independent movement in relation to one another via imparting movement in the perimeter section, the primary end portion has a primary pivotal attachment to the extension arm positioned adjacent to the partial peripheral margin The primary end portion primary pivotal attachment having primary pivotal movement that is about an primary pivotal axis that is parallel to the first pivotal axis, the secondary end portion has a secondary pivotal attachment to the extension arm positioned adjacent to the eyelet. The secondary end portion secondary pivotal attachment having secondary pivotal movement that is about a secondary pivotal axis that is parallel to the first pivotal axis, the primary pivotal axis and the secondary pivotal axis are offset from one another to create movement in the perimeter section, wherein a portion of the perimeter section removably contacts the tip end portion.

Wherein operationally, the movement in the perimeter section causes a bias in the finger extension to urge the portion of the perimeter section to contact the tip end portion in a default state in a bias direction requiring manual force to intervene to separate the portion of the perimeter section from the tip end portion. The finger extension is operational to close off a distance between the partial peripheral margin and the tip end portion to positively retain the second article within the hook via the second article aperture.

These and other objects of the present invention will become more readily appreciated and understood from a consideration of the following detailed description of the exemplary embodiments of the present invention when taken together with the accompanying drawings, in which;

DESCRIPTION OF DRAWINGS

FIG. 2 shows a side elevation view of the retainer apparatus as described on FIG. 1, wherein FIG. 2 shows the addition of showing a secondary end portion of the flexible finger extension;

FIG. 3 shows an opposing side elevation view in relation to FIG. 2, wherein FIG. 3 shows the flexible finger extension relationship between the primary end portion and the secondary end portion;

REFERENCE NUMBERS IN DRAWINGS

Figure 1:
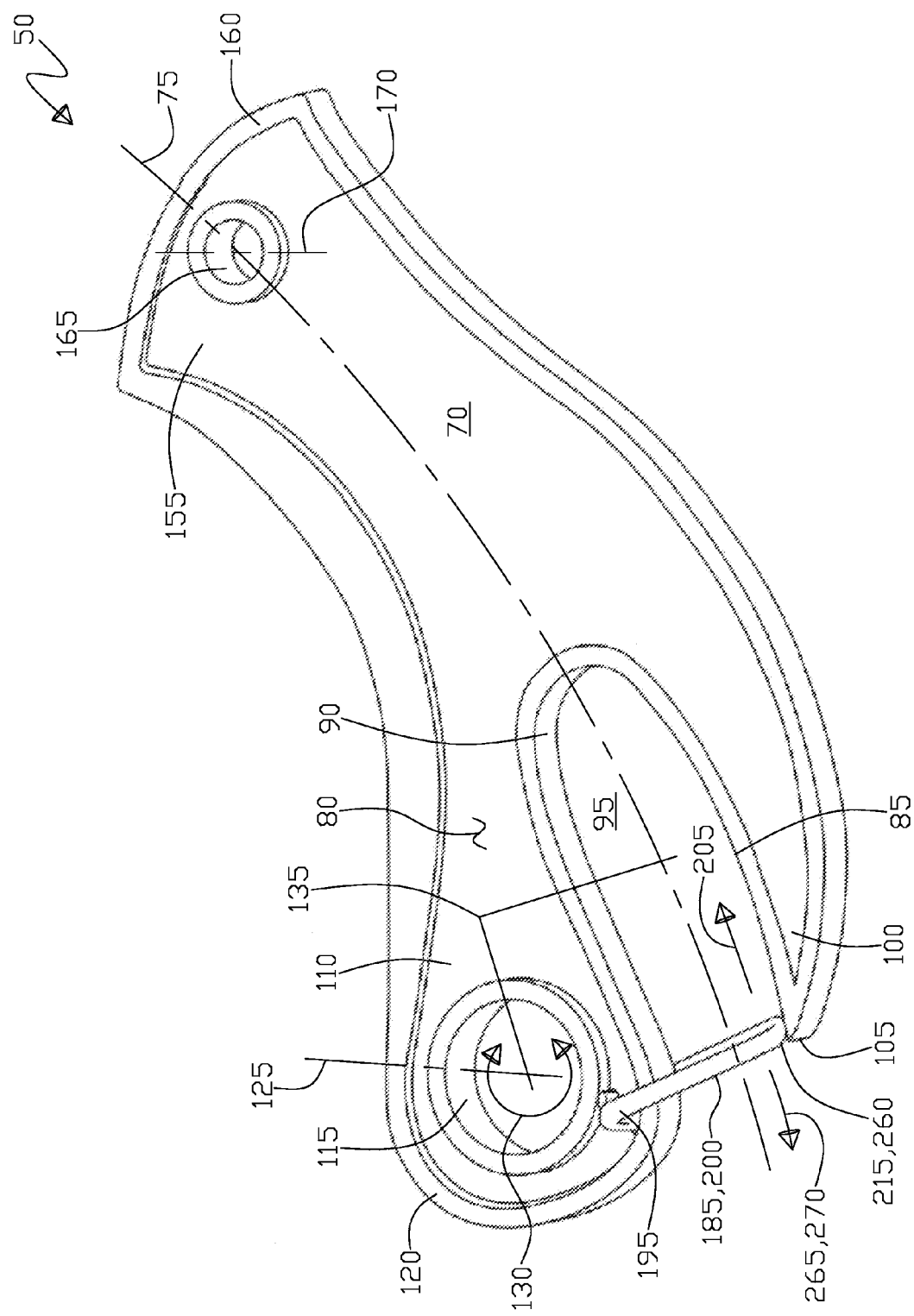
FIG. 1 shows a perspective view of the retainer apparatus that includes a beam, a longitudinal axis of the beam, a first end portion of the beam, an open ended hook, an inside surface of the hook, a void of the hook, a cantilever section, a tip end portion, an extension arm, an eyelet, a partial peripheral margin, a first pivotal axis, a first pivotal movement, a perpendicular orientation of the first pivotal axis to the longitudinal axis, a second end portion of the beam, a distal end portion, a cavity, a cavity pivotal axis, a flexible finger extension, a primary end portion, a perimeter section, a movement of the perimeter section, a portion of the perimeter section disposed between the primary end portion and the secondary end portion, a portion of the perimeter section that removably contacts the tip, a bias of the perimeter section, a direction of the bias.

50 Retainer apparatus
55 First article
60 Second article
65 Aperture of the second article 60
70 Beam
75 Longitudinal axis of the beam 70
80 First end portion of the beam 70
85 Open ended hook of the first end portion 80
90 Inside surface of the hook 85
95 Void of the hook 85
100 Cantilever section of the hook 85
105 Tip end portion of the cantilever section 100
110 Extension arm of the first end portion 80
115 Eyelet of the first end portion 80
120 Partial peripheral margin of the eyelet 115
125 First pivotal axis
130 First pivotal movement about the first pivotal axis 125
135 Perpendicular orientation as between the first pivotal axis 125 and the longitudinal axis 75
140 Pivotal attachment of the eyelet 115 to the first article 55
145 Removable engagement of the open ended hook 85 with the second article aperture 65
150 Slidable contact of the removable engagement 145
155 Second end portion of the beam 70
160 Distal portion of the second end portion 155
165 Cavity of the second end portion 155
170 Cavity pivotal axis
175 Manually moving away the cavity 165 from the second article 60
180 Dislodging the second article 60 from the void 95
185 Flexible finger extension
190 Open ended perimeter of the flexible finger extension 185
195 Primary end portion of the flexible finger extension 185
200 Perimeter section
205 Movement in the perimeter section 200
210 Secondary end portion of the flexible finger extension 185
215 Portion of the perimeter section 200 disposed between the primary end portion 195 and the secondary end portion 210
220 Primary pivotal attachment of the primary end portion 195 to the extension arm 110
225 Primary pivotal axis
230 Primary pivotal movement about the primary pivotal axis 225
235 Secondary pivotal attachment of the secondary end portion 210 to the extension arm 110
240 Secondary pivotal axis
245 Secondary pivotal movement about the secondary pivotal axis 240
250 Overlap of the primary 195 and secondary 210 end portions
255 Offset as between the primary pivotal axis 225 and the secondary pivotal axis 240
260 Portion of the perimeter section 200 that removably contacts the tip end portion 105
265 Bias of the portion of the perimeter section 200 to removably contact 260 the tip end portion 105 in a default state
270 Bias direction
275 Free ends of the primary end portion 195 and the secondary end portion 210 relative to one another
280 Inward disposition of the primary end portion 195 to the secondary end portion 210
285 Archimedean spiral shape of the flexible finger extension 1850
290 Longwise axis of the Archimedean spiral shape 285
295 Total length of the Archimedean spiral shape 285
300 Midpoint of the Archimedean spiral shape 285 defined as a vertex
305 Acute angle of the longwise axis 290 of the Archimedean spiral shape 285 emanating from the vertex 300 in the perimeter section 200
310 Long leg emanating from the vertex 300
315 Long leg diverges from the vertex 300 opposite from the bias direction 270
320 Short leg emanating from the vertex 300
325 Short leg diverges from the vertex 300 equal to the bias direction 270
330 Manual force direction to separate the portion 215 of the perimeter section 200 from the tip end portion 105
335 Distance as between the partial peripheral margin 120 and the tip end portion 105

DETAILED DESCRIPTION

Starting with FIG. 1, shown is a perspective view of the retainer apparatus 50 that includes a beam 70, a longitudinal axis 75 of the beam 70, a first end portion 80 of the beam 70, an open ended hook 85, an inside surface 90 of the hook 85, and a void 95 of the hook 85. Further shown in FIG. 1 is a cantilever section 100, a tip end portion 105, an extension arm 110, an eyelet 115, a partial peripheral margin 120, a first pivotal axis 125, a first pivotal movement 130, and a perpendicular orientation 135 of the first pivotal axis 125 to the longitudinal axis 75. In addition, FIG. 1 shows a second end portion 155 of the beam 70, a distal end portion 160, a cavity 165, a cavity 165 pivotal axis 170, a flexible finger extension 185, a primary end portion 195, a perimeter section 200, a movement 205 of the perimeter section 200, a portion 215 of the perimeter section 200 disposed between the primary end portion 195 and the secondary end portion 210. Also FIG. 1 shows a portion 260 of the perimeter section 200 that removably contacts the tip 105, bias 265 of the perimeter section 200, and a direction 270 of the bias 265.

Figure 2:
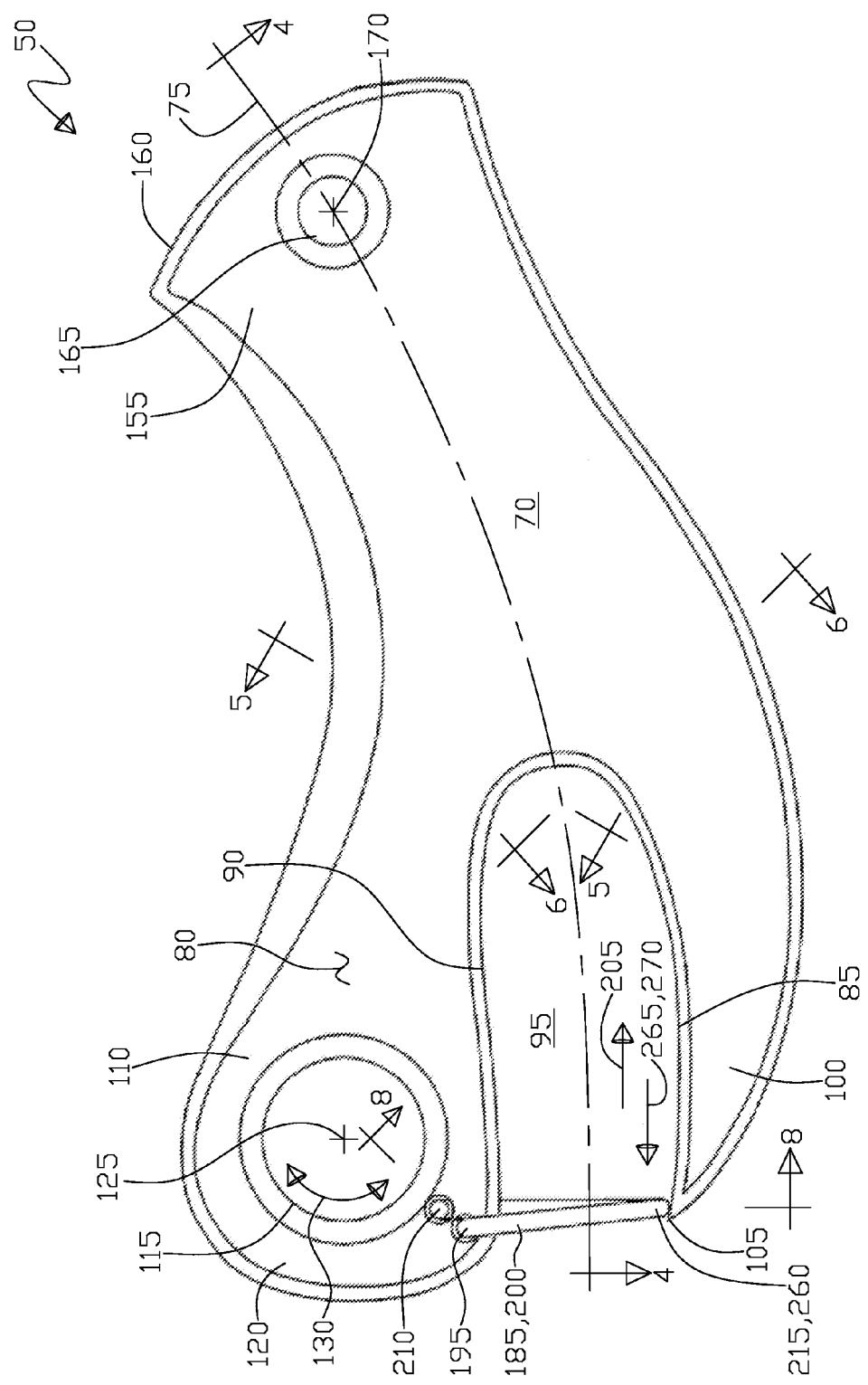
Figure 3:
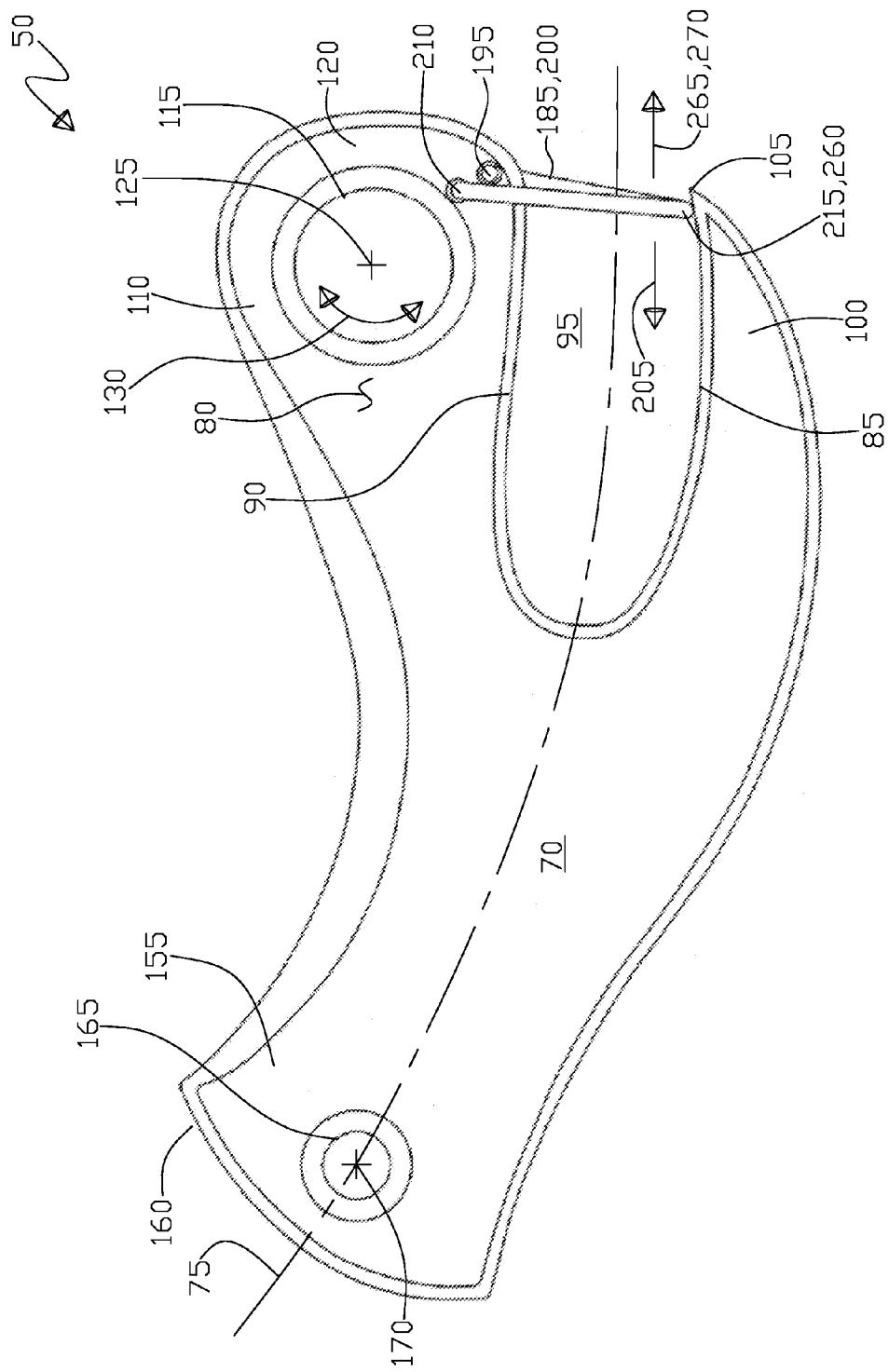
Figure 4:
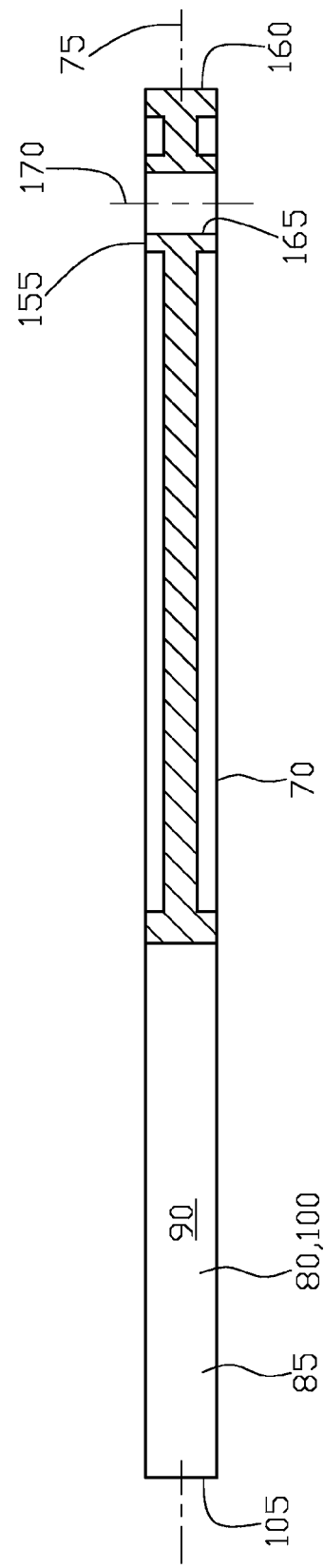
FIG. 4 shows cross section cut 4-4 from FIG. 2, with FIG. 4 showing in particular the tip end portion, the open ended hook inside surface, the beam, the cavity pivotal axis, the cavity, the beam second end portion, the distal portion, and the longitudinal axis of the beam.

Next, FIG. 2 shows a side elevation view of the retainer apparatus 50 as described on FIG. 1 and with the addition of showing a secondary end portion 210 of the flexible finger extension 185. Continuing, FIG. 3 shows an opposing side elevation view in relation to FIG. 2, wherein the flexible finger extension 185 relationship between the primary end portion 195 and the secondary end portion 210 on a side opposite of FIG. 2 is shown. Further, FIG. 4 shows cross section cut 4-4 from FIG. 2, with FIG. 4 showing in particular the tip end portion 105, the open ended hook 85 inside surface 90, the beam 70, the cavity pivotal axis 170, the cavity 165, the beam 70 second end portion 155, the distal portion 160, and the longitudinal axis 75 of the beam 70.

Figure 5:
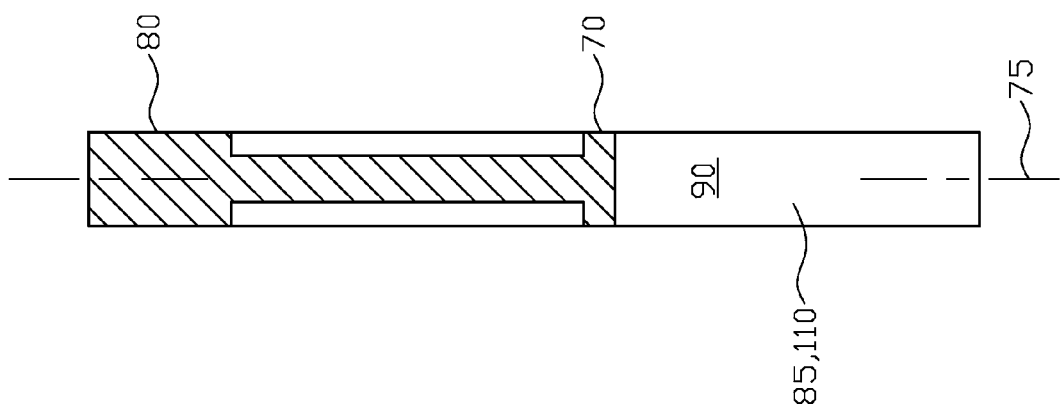
FIG. 5 shows cross section cut 5-5 from FIG. 2, with FIG. 5 showing in particular the longitudinal axis, the open ended hook inside surface, the extension arm, and the first end portion of the beam.

Moving onward, FIG. 5 shows cross section cut 5-5 from FIG. 2, with FIG. 5 showing in particular the longitudinal axis 75, the open ended hook 85 inside surface 90, the extension arm 110, of the first end portion 80 of the beam 70. Next, FIG.

Figure 6:
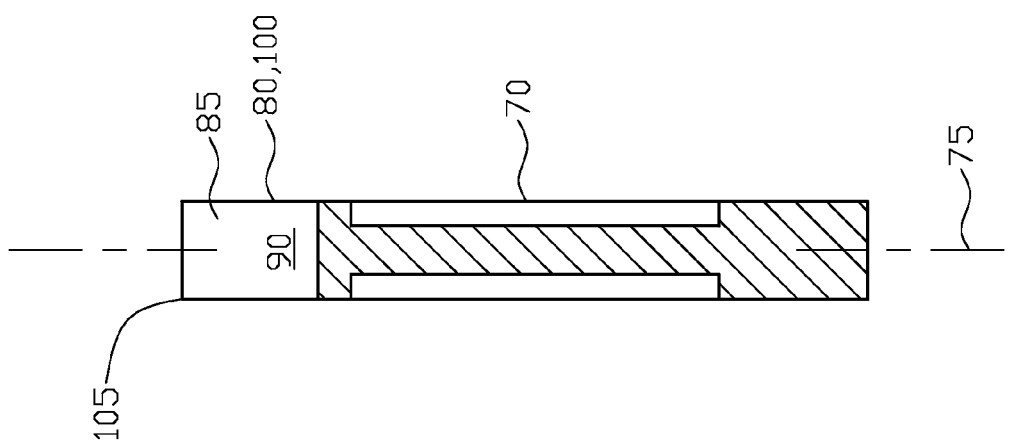
FIG. 6 shows cross section cut 6-6 from FIG. 2, with FIG. 6 showing in particular the longitudinal axis, the beam, the inside surface of the hook, the first end portion of the beam, the cantilever section of the hook, the open ended hook, and the tip end portion.

6 shows cross section cut 6-6 from FIG. 2, with FIG. 6 showing in particular the longitudinal axis 75, the beam 70, the inside surface 90 of the hook 85, the first end portion 80 of the beam 70, the cantilever section 100 of the hook 85, the open ended hook 85, and the tip end portion 105.

Figure 7:
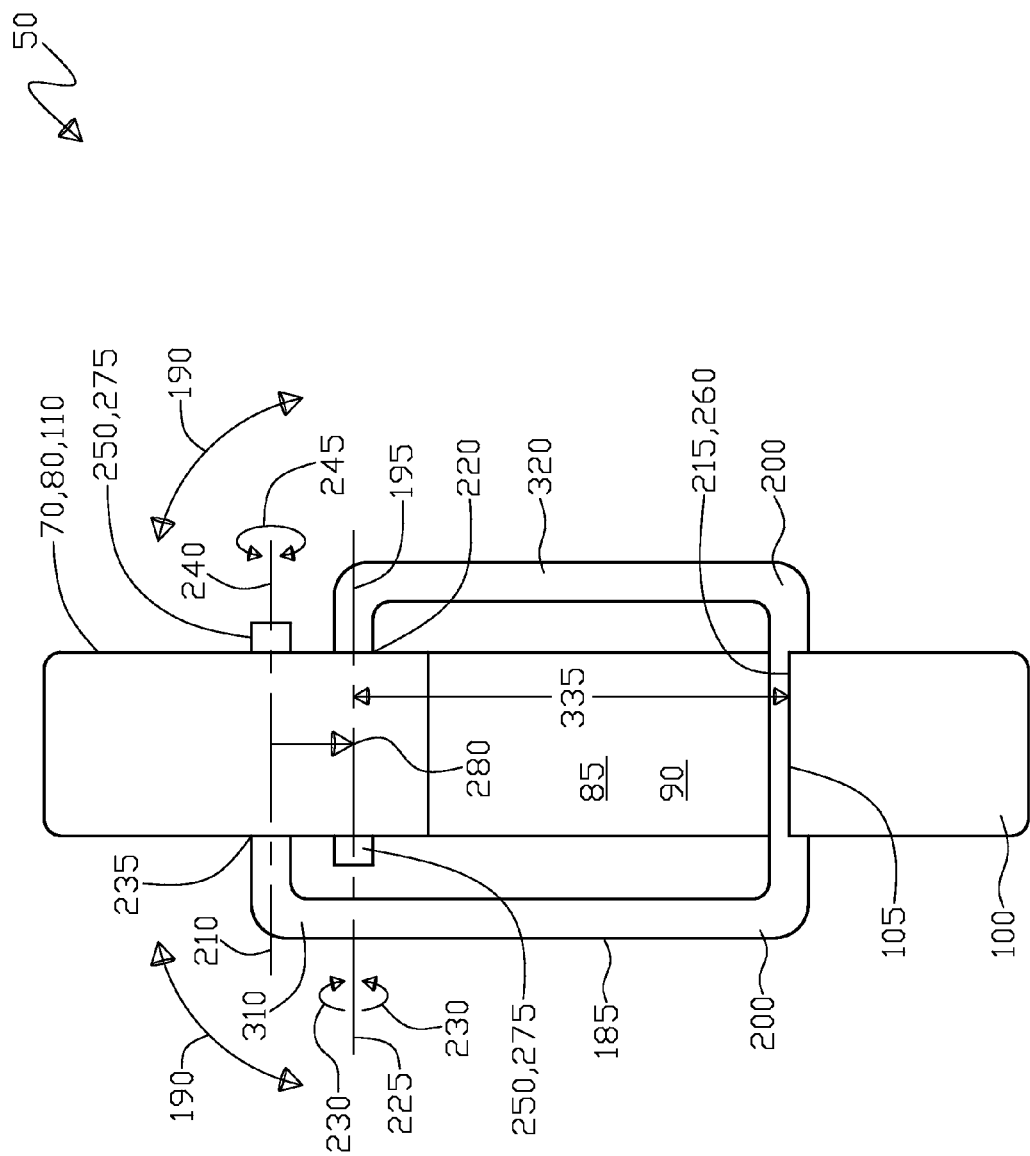
FIG. 7 shows an end view elevation of the retainer apparatus from the flexible finger extension side showing in particular a primary pivotal axis as spaced apart from the secondary pivotal axis, with the inward disposition of the primary end portion to the secondary end portion, the tip end portion removably contacted by a portion of the perimeter section, plus the hook and surface of the hook, and the primary and secondary pivotal movements.

Continuing, FIG. 7 shows an end view elevation of the retainer apparatus 50 from the flexible finger extension 185 side showing in particular a primary pivotal axis 225 as spaced apart 255 from the secondary pivotal axis 240, with the inward disposition 280 of the primary end portion 195 to the secondary end portion 210, the tip end portion 105 removably contacted by a portion 260 of the perimeter section 200, plus the hook 85 and surface 90 of the hook 85, and the primary 230 and secondary 245 pivotal movements.

Figure 8:
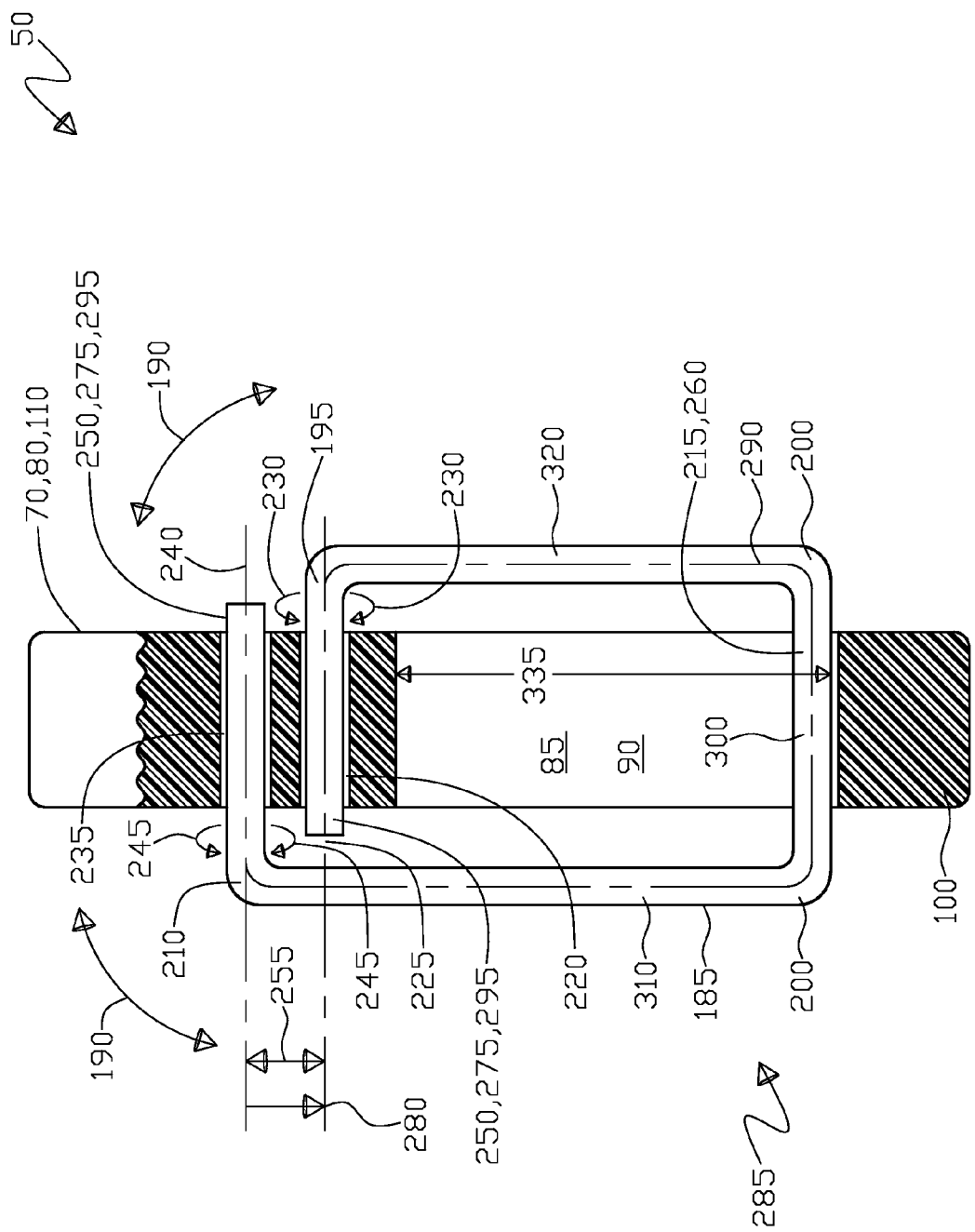
FIG. 8 shows cross section cut 8-8 from FIG. 2, with FIG. 8 showing in particular the cross section of the partial peripheral portion of the eyelet about the flexible finger extension being in particular the primary end portion and the secondary end portion with their respective primary and secondary pivotal axes that are offset from one another, and the tip end portion removably contacted by a portion of the perimeter section.

Next, FIG. 8 shows cross section cut 8-8 from FIG. 2, with FIG. 8 showing in particular the cross section of the partial peripheral portion 120 of the eyelet 115 about the flexible finger extension 185 being in particular the primary end portion 195 and the secondary end portion 210 with their respective primary 225 and secondary 240 pivotal axes that are offset 255 from one another, and the tip end portion 105 removably contacted by a portion 260 of the perimeter section 200.

Figure 9:
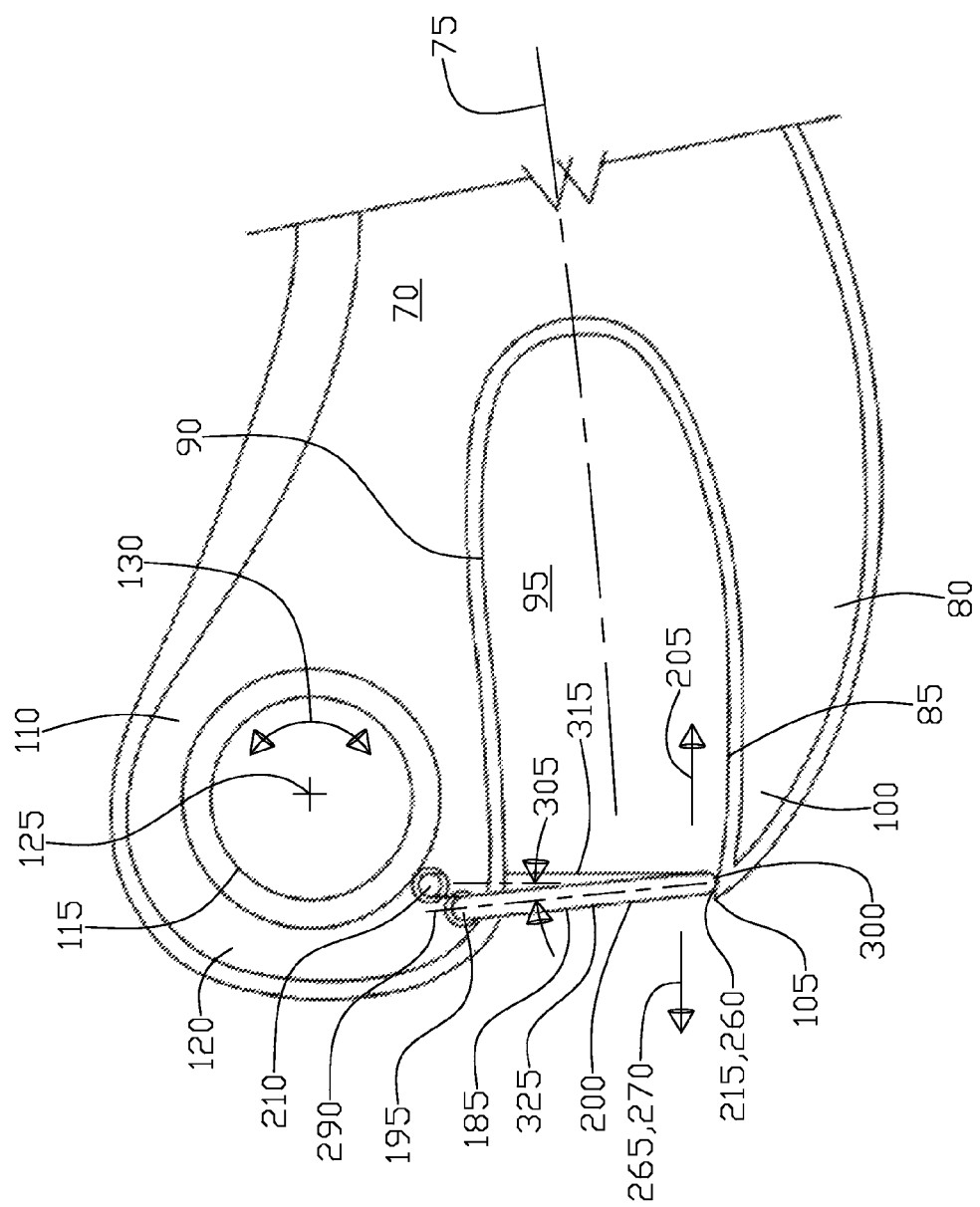
FIG. 9 shows the side elevation view as shown in FIG. 2, with FIG. 9 primarily focusing on the first end portion of the beam and in particular the flexible finger extension in a default state due to a bias force making the tip end portion removably contacted by a portion of the perimeter section, plus also shown is a longwise axis of the Archimedean spiral shape with the accompanying acute angle formed by the longwise axis emanating from the vertex of the perimeter section.

Moving onward, FIG. 9 shows the side elevation view as shown in FIG. 2, with FIG. 9 primarily focusing on the first end portion 80 of the beam 70 and in particular the flexible finger extension 185 in a default state due to the bias 265 force 270 making the tip end portion 105 removably contacted by a portion 260 of the perimeter section 200, plus also shown is a longwise axis 290 of the Archimedean spiral shape 285 with the accompanying acute angle 305 formed by the longwise axis 290 emanating from the vertex 300 of the perimeter section 200.

Figure 10:
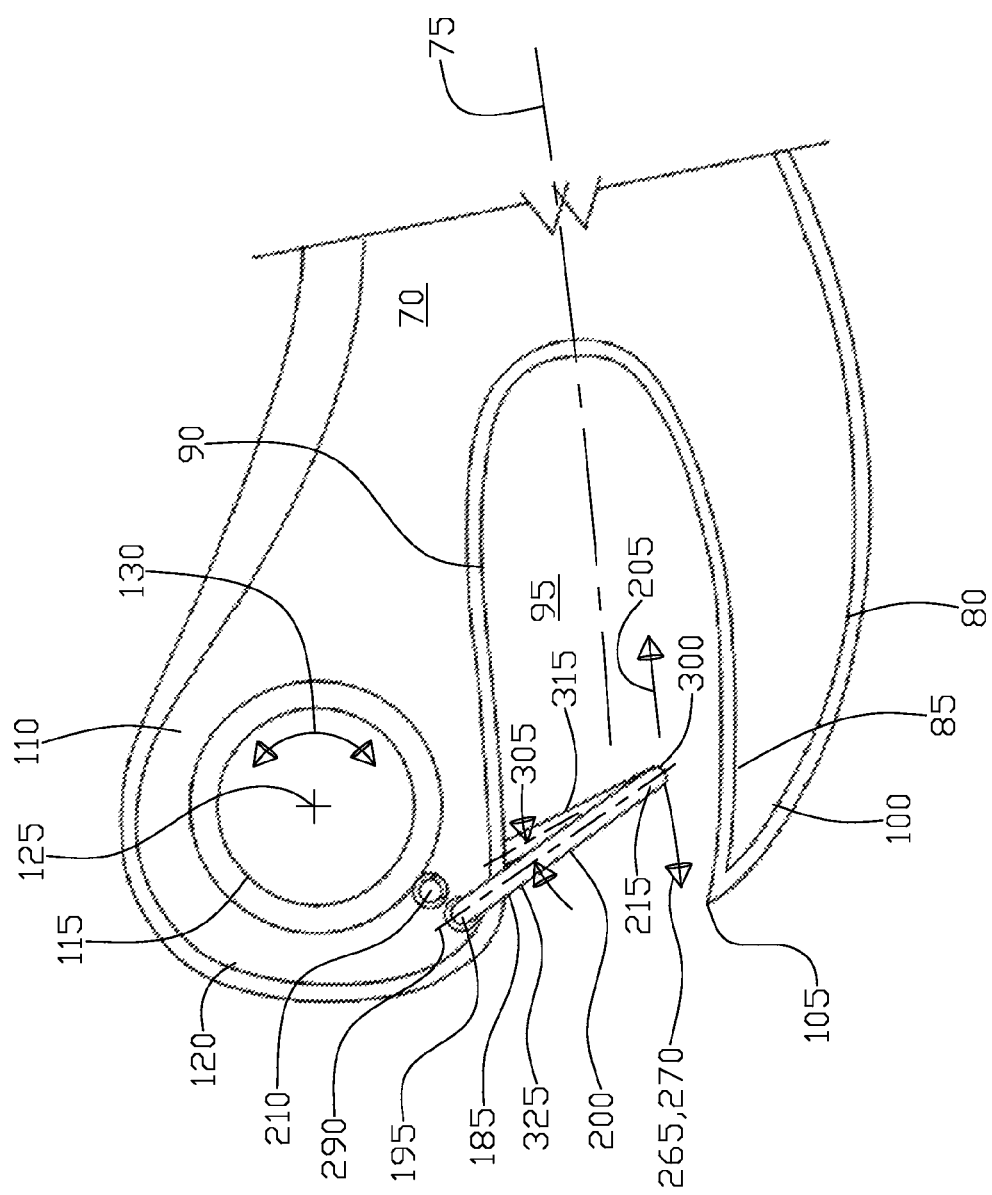
FIG. 10 shows the side elevation view as shown in FIG. 9, with FIG. 10 showing the flexible finger extension in a manually initiated open state via exerting a manual force to overcome the bias thus separating the portion of the perimeter section from the tip end portion to open the hook plus with the longwise axis of the Archimedean spiral shape with the accompanying acute angle increase formed by the longwise axis emanating from the vertex of the perimeter section in going from the default state of the flexible finger extension to the open state of the flexible finger extension.

Further, FIG. 10 shows the side elevation view as shown in FIG. 9, with FIG. 10 showing the flexible finger extension 185 in a manually 330 initiated open state via exerting a manual force 330 to overcome the bias 270 thus separating the portion 260 of the perimeter section 200 from the tip end portion 105 to open the hook 85 plus with the longwise axis 290 of the Archimedean spiral shape 285 with the accompanying acute angle 305 increase formed by the longwise axis 290 emanating from the vertex 300 of the perimeter section 200 in going from the default state of the flexible finger extension 185, as shown in FIG. 9 to the open state of the flexible finger extension 185 as shown in FIG. 10.

Figure 11:
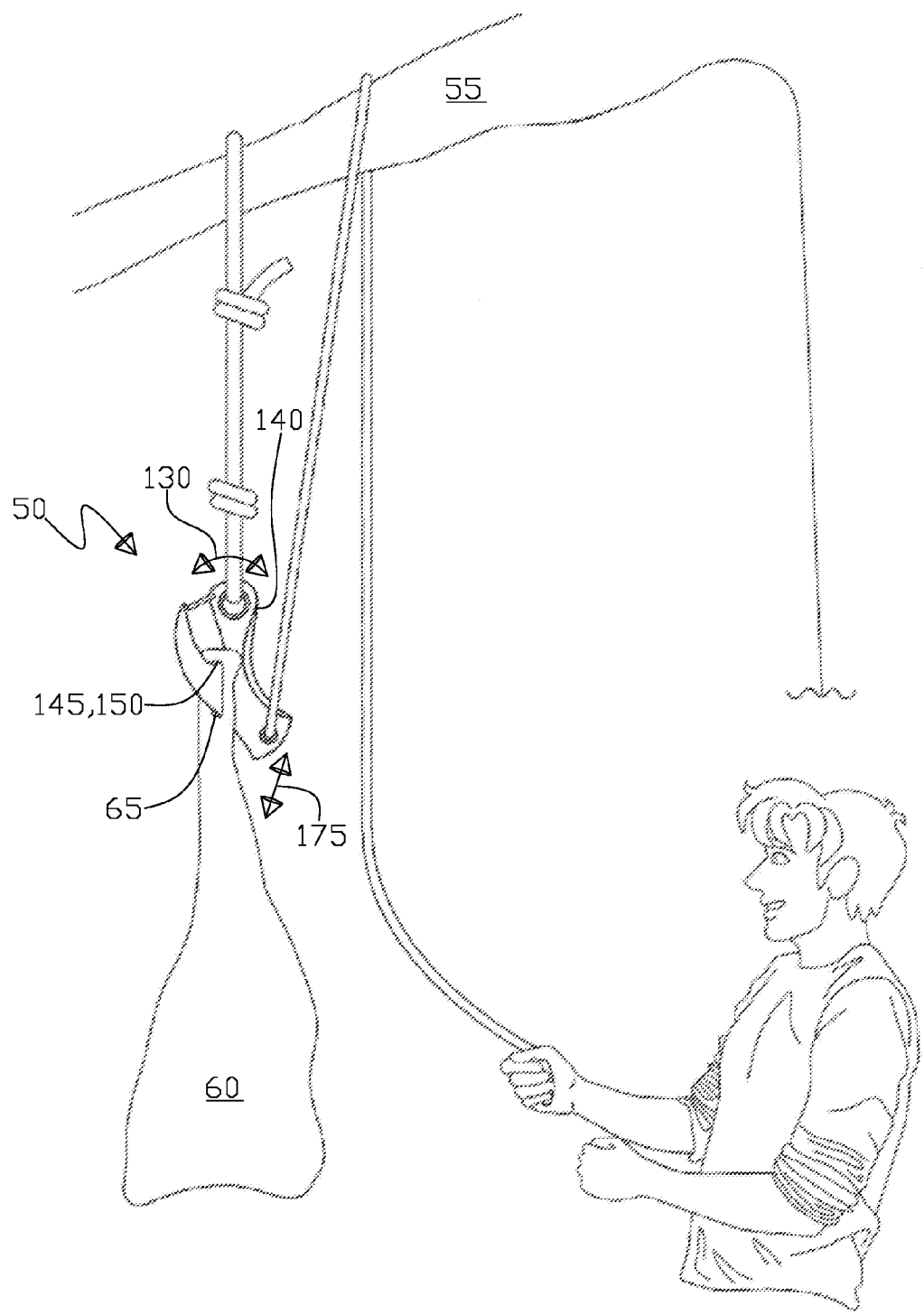
FIG. 11 shows a use view of the retainer apparatus that includes the first and second articles, with the retainer apparatus suspended from the first article with the second article aperture that is disposed within the hook surface with the flexible finger extension in the default or hook closed state thus retaining the second article to the hook.

Next, FIG. 11 shows a use view of the retainer apparatus 50 that includes the first 55 and second 60 articles, with the retainer apparatus 50 suspended from the first article 55 with the second article 60 aperture 65 that is disposed within the hook 85 surface 90 with the flexible finger extension 185 in the default or hook 85 closed state thus retaining the second article 60 to the hook 85.

Figure 12:
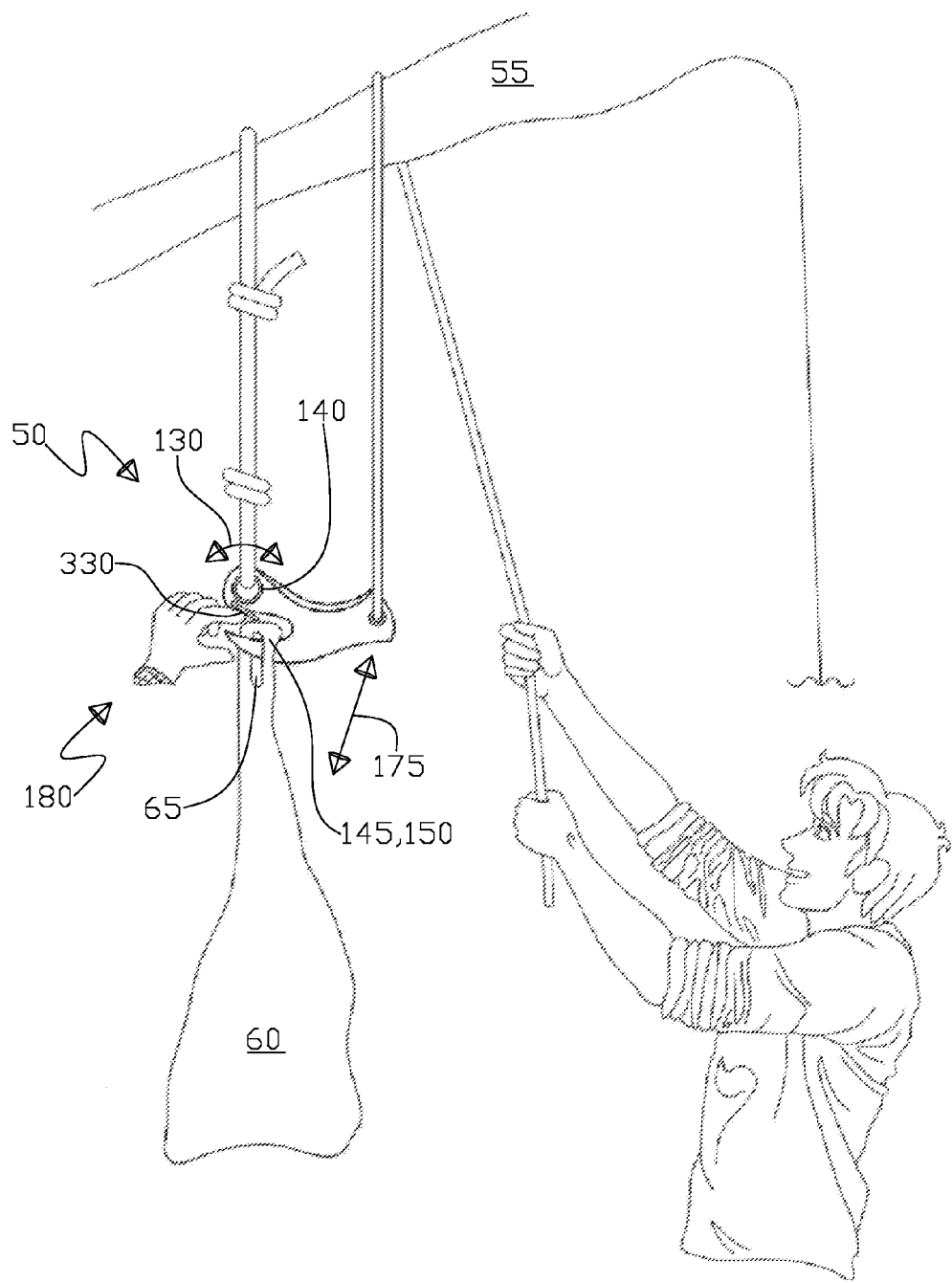
FIG. 12 shows FIG. 11 with the change in FIG. 12 being that the flexible finger extension is being positioned in a manually initiated open state via exerting the manual force to overcome the default state bias thus separating the portion of the perimeter section from the tip end portion to open the hook and thus facilitating a release of the second article aperture from the hook.

Further, FIG. 12 shows FIG. 11 with the change in FIG. 12 being that the flexible finger extension 185 is being positioned a manually 330 initiated open state via exerting the manual force 330 to overcome the default state bias thus separating the portion 260 of the perimeter section 200 from the tip end portion 105 to open the hook 85 and thus facilitating a release of the second article 60 aperture 65 from the hook 85.

Figure 13:
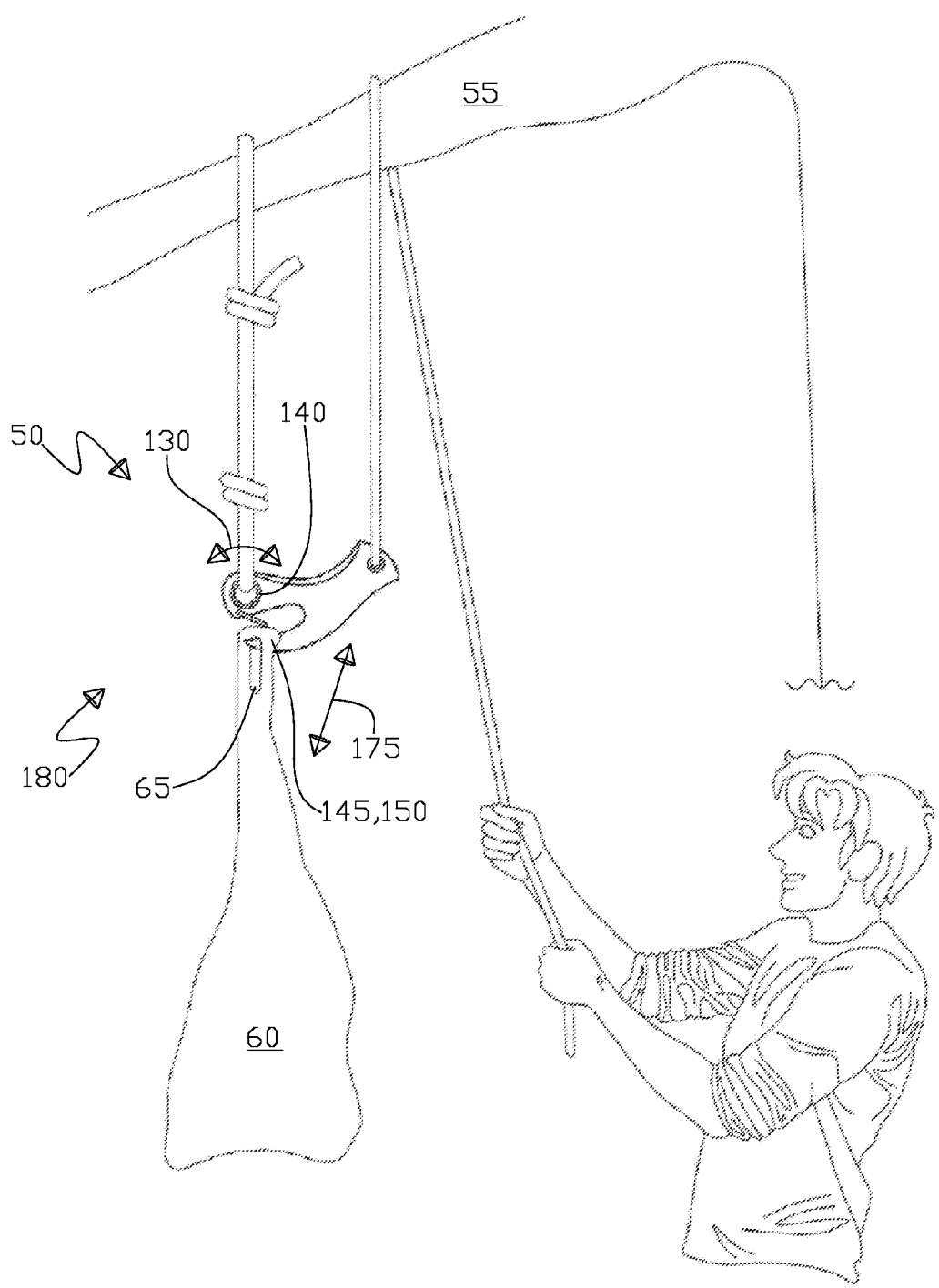
FIG. 13 shows a continuation of FIG. 12, with the change in FIG. 13 being the initiation of a manual force to move away the cavity from the second article aperture to release the second article from the retainer apparatus.
Figure 14:
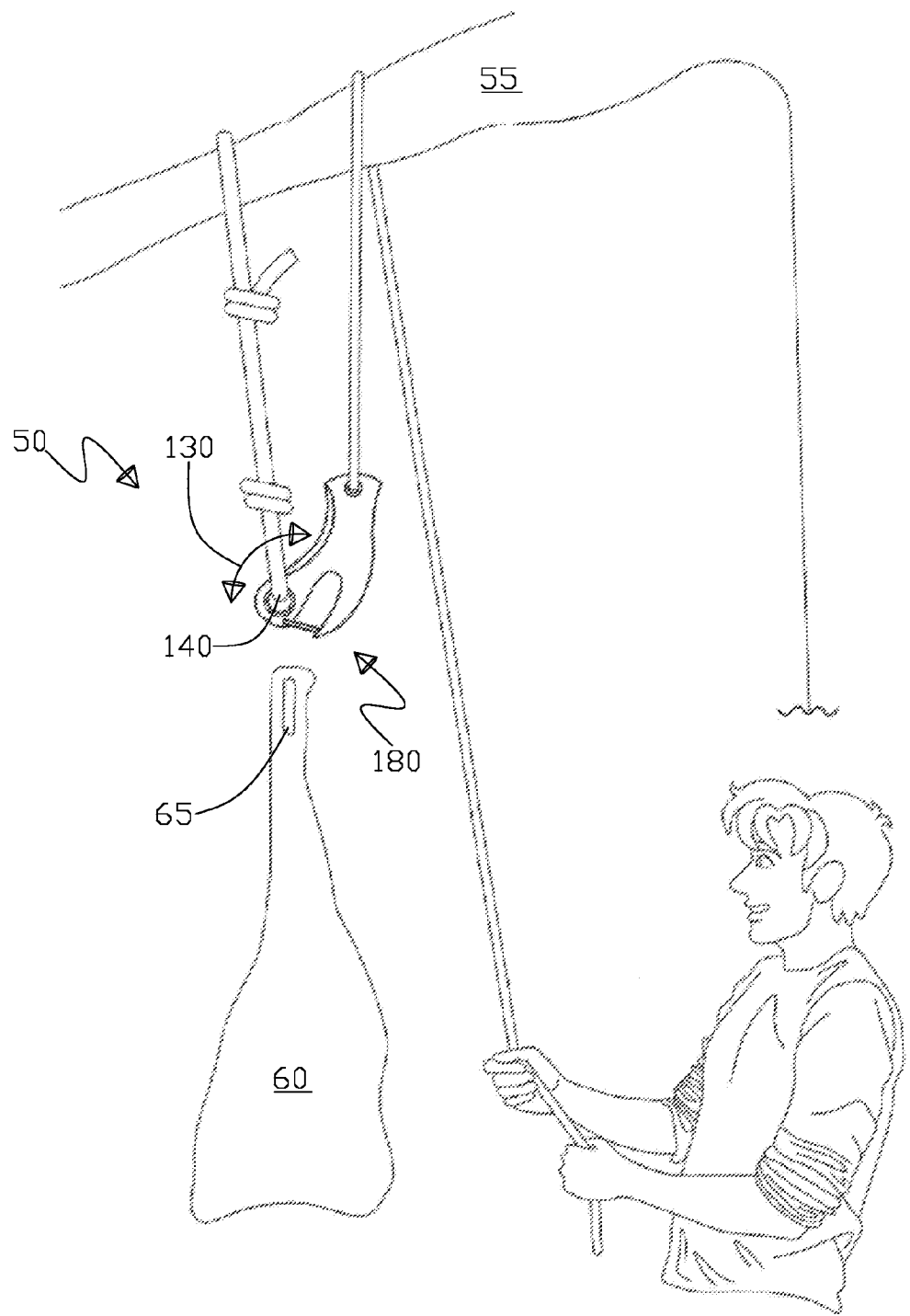
FIG. 14 shows a further continuation of FIG. 13, with the change in FIG. 14 showing the complete release of the second article from the retainer apparatus.

Yet further, FIG. 13 shows a continuation of FIG. 12, with the change in FIG. 13 being the initiation of a manual force 175 to move away the cavity 165 from the second article 60 aperture 65 to release the second article 60 from the retainer apparatus 50. With, FIG. 14 showing a further continuation of FIG. 13, with the change in FIG. 14 showing the complete release of the second article 60 from the retainer apparatus 50.

Broadly in referring to FIGS. 1 to 10, the present invention of the retainer apparatus 50 is for removably engaging the first article 55 to the second article 60, the second article 60 having the aperture 65 therethrough, the apparatus 50 including the beam 70 having the longitudinal axis 75, the beam 70 including the first end portion 80 and the opposing second end portion 155. Wherein, the longitudinal axis 75 spans therebetween the first end portion 80 and the second end portion 155, as best shown in FIGS. 1 to 3. The first end portion 80 is affixed as an open ended hook 85, the hook 85 being defined by the inside surface 90 forming a void 95, wherein the hook 85 has the cantilever section 100 terminating in the tip end portion 105 and an opposing extension arm 110 terminating in the eyelet 115 with a partial peripheral margin 120, wherein there is a distance 335 between the partial peripheral margin 120 and the tip end portion 105, again see FIGS. 1 to 3.

The eyelet 115 facilitates a first pivotal movement 130 about a first pivotal axis 125 that is perpendicular 135 to the longitudinal axis 75. Wherein operationally, the eyelet 115 is pivotally attached 140 the first article 55, see FIGS. 11 to 14, thus the open ended hook 85 is solely removably engagable 145 with the second article 60 aperture 65 via a slidable contact 150 with the inside surface 90 to be within the void 95, the beam 70 second end portion 155 terminating in a second end distal portion 160. Further included in the retainer apparatus 50 is a flexible finger extension 185 constructed of an elongated element that is bent to form an open ended perimeter 190, wherein the elongated element terminates in a primary end portion 195, going to a perimeter section 200, and terminates in an opposing secondary end portion 210, see FIGS. 1 to 3 and 7 to 10.

Wherein the primary 195 and secondary 210 end portions overlap 250 one another and are capable of independent movement in relation to one another via imparting movement in the perimeter section 200, the primary end portion 195 has a primary pivotal attachment 220 to the extension arm 110 positioned adjacent to the partial peripheral margin 120, see FIGS. 1 to 3, 9, and 10. The primary end portion 195 primary pivotal attachment 220 having primary pivotal movement 230 that is about an primary pivotal axis 225 that is parallel to the first pivotal axis 125, the secondary end portion 210 has a secondary pivotal attachment 235 to the extension arm 110 positioned adjacent to the eyelet 115.

The secondary end portion 210 secondary pivotal attachment 235 having secondary pivotal movement 245 that is about the secondary pivotal axis 240 that is parallel to the first pivotal axis 125, the primary pivotal axis 225 and the secondary pivotal axis 240 are offset 255 from one another to create movement 205 in the perimeter section 200, see in particular FIGS. 7 and 8, wherein a portion 260 of the perimeter section 200 removably contacts the tip end portion 105, see FIGS. 9 and 10.

Wherein operationally, the movement 205 in the perimeter section 200 causes a bias 265 in the finger extension 185 to urge 270 the portion 260 of the perimeter section 200 to contact the tip end portion 105 in a default state, see FIGS. 1 to 3 and 7 to 9, in a bias direction 270 requiring manual force 330 to intervene to separate the portion 260 of the perimeter section 200 from the tip end portion 105, see in particular FIGS. 10 and 12. The finger extension 185 is operational to close off a distance between the partial 215 peripheral margin 200 and the tip end portion 105 to positively retain the second article 60 within the hook 85 via the second article aperture 65, see in particular FIG. 11, and FIGS. 1 to 3 and 7 to 9.

Further, on the retainer apparatus 50, the primary end portion 195 and the secondary end portion 210 are free ends 275 relative to one another with the primary end portion 195 disposed inward 280 of the secondary end portion 210, see FIGS. 7 and 8, such that the primary end portion 195, the perimeter section 200, and the secondary end portion 210 altogether substantially form the Archimedean spiral 285 in shape to operationally enhance the bias 265, see FIGS. 7 to 10.

In addition, on the retainer apparatus 50, the flexible finger extension 185 has the longwise Archimedean axis 290 that spans the primary end portion 195, the perimeter section 200, and the secondary end portion 210, see FIGS. 8 to 10. The Archimedean axis 290 has a total length 295 spanning between the primary end portion 195 and the secondary end portion 210 with a midpoint of the total length defined as a vertex 300, wherein the acute angle 305 is formed along the Archimedean axis 290 for the perimeter section 200 emanating from the vertex 300 to operationally further enhance the bias 265, see FIG. 8 and FIGS. 9 and 10.

Further, on the retainer apparatus 50, the perimeter section 200 has a long leg 310 emanating from the vertex 300 and a short leg 320 emanating from the vertex 300, see FIG. 8 in particular, and FIGS. 1 to 3, 7, 9, and 10. Wherein, the short leg 320 and the long leg 310 have the acute angle 305 relationship to one another, see FIGS. 9 and 10. Wherein, the short leg 320 diverges 325 from the vertex 300 in a direction that is equal to the bias direction 270 and the long leg 310 diverges 315 from the vertex 300 in a direction that is opposite from the bias direction 270 to operationally further enhance the bias direction 265 force 270. Note that acute angle 305 in going from FIG. 9 to FIG. 10 increases due to the flex in the perimeter section 200 due to the offset 255 and inward disposition 280 which acts to create the bias 265 direction 270, as shown in FIGS. 7 to 10.

Also, on the retainer apparatus 50, the beam 70 second end portion 155 can further comprise the cavity 165 having the cavity pivotal axis 170 that is parallel to the first pivotal axis 125, wherein operationally the cavity 165 is manually moved 175 away from the second article 60 thereby causing the first pivotal movement 130 to help dislodge 180 the second article 60 aperture 65 from the void 95, see FIGS. 11 to 14.

All such equivalent modifications that remain within the teaching of the present invention. While not shown, it is readily apparent that a single rod can be inserted through the pivot holes of two or more of the load-bearing support systems and used in numerous modes such as, but not limited to, hanging merchandise in clothing stores, plants in greenhouses or homes, skis in ski shops or ski lodges, bicycles, tools, and other items in shops or garages, or aerial displays of items, or at construction sites. The retainer apparatus 50 of the present invention may be used in anyway or in any environment that a hook is normally used, for example to carry a waterproof sheet full of water or fire retardant for release at that site of a forest-fire.

It is therefore seen that the present invention provides load-bearing support hooks that are designed to be swingably suspended to hold the second article 60 on the hook 85 in a first stable position, and, when desired, to be rotated 175 to easily deploy and release the second article 60 from the hook 85, with such a hook 85 designed to be swingably suspended from the first article 55 to hold the second article 60 in a first stable position, and, when desired, to be rotated 175 to easily release the second article 60 from the hook 85, as shown in FIGS. 11 to 14. It has been shown that in preferred embodiments the load-bearing support retainer apparatus 50 in particular the beam 70 is a single piece that when held aloft it will normally be oriented in a first stable position, see FIG. 11, with the tip 105 of the hook 85 above the horizontal to carry the second article 60, and wherein further the retainer apparatus 50 is rotatable 175 about a pivot support 130 to position the tip 105 of the hook 85 at or below the horizontal so that the second article 60 carried by the retainer apparatus 50 is placed into a position for deployment 180 and release from the hook 85.

It has also been disclosed that the beam 70 of the present invention may be made of very light weight rigid plastic or metal, with the flexible finger extension 185 needing to constructed of a flexible material. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, maybe suitably practiced in the absence of the specific elements which are disclosed herein.

CONCLUSION

Accordingly, the present invention of the retainer apparatus has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A retainer apparatus for removably engaging a first article to a second article, the second article having an aperture therethrough, said apparatus comprising:
(a) a beam having a longitudinal axis, said beam including a first end portion and an opposing second end portion, wherein said longitudinal axis spans therebetween said first end portion and said second end portion, said first end portion is affixed as an open ended hook, said hook being defined by an inside surface forming a void, wherein said hook has a cantilever section terminating in a tip end portion and an opposing extension arm terminating in an eyelet with a partial peripheral margin, said eyelet facilitates a first pivotal movement about a first pivotal axis that is perpendicular to said longitudinal axis, wherein said beam second end portion further comprises a cavity having a cavity pivotal axis that is parallel to said first pivotal axis, said beam second end portion terminating in a second end distal portion, wherein operationally said eyelet is pivotally attached the first article, said open ended hook is solely removably engagable with the second article aperture via slidable contact with said inside surface to be within said void, further operationally said cavity is manually moved away from the second article thereby causing said first pivotal movement to help dislodge the second article aperture from said void; and
(b) a flexible finger extension constructed of an elongated element that is bent to form an open ended perimeter, wherein said elongated element terminates in a primary end portion, going to a perimeter section, and terminates in an opposing secondary end portion, wherein said primary and secondary end portions overlap one another and are capable of independent movement in relation to one another via imparting movement in said perimeter section, said primary end portion has a primary pivotal attachment to said extension arm positioned adjacent to said partial peripheral margin, said primary end portion primary pivotal attachment having primary pivotal movement is about an primary pivotal axis that is parallel to said first pivotal axis, said secondary end portion has a secondary pivotal attachment to said extension arm positioned adjacent to said eyelet, said secondary end portion secondary pivotal attachment having secondary pivotal movement is about an secondary pivotal axis that is parallel to said first pivotal axis, said primary pivotal axis and said secondary pivotal axis are offset from one another to create movement in said perimeter section, wherein said primary end portion and said secondary end portion are free ends relative to one another with said primary end portion disposed inward of said secondary end portion such that said primary end portion, said perimeter section, and said secondary end portion all together substantially form an Archimedean spiral in shape, wherein a portion of said perimeter section removably contacts said tip end portion, wherein said flexible finger extension has a longwise Archimedean axis that spans said primary end portion, said perimeter section, and said secondary end portion, said Archimedean axis has a total length spanning between said primary end portion and said secondary end portion with a midpoint of said total length defined as a vertex, wherein an acute angle is formed along said Archimedean axis for said perimeter section emanating from said vertex, said primary pivotal axis primary pivotal attachment is coincident with said longwise axis on one leg of said acute angle and said secondary pivotal axis secondary pivotal attachment is coincident with said longwise axis on an opposing leg of said acute angle, wherein operationally said movement in said perimeter section causes a bias in said finger extension to urge said portion of said perimeter section to contact said tip end portion in a closed hook default state in a bias direction requiring manual force to intervene to separate said portion of said perimeter section from said tip end portion placing said hook in an open state, said acute angle is structurally present in both the default state and the open state, said finger extension is operational to removably close off a distance between said partial peripheral margin and said tip end portion to positively retain the second article within said hook via the second article aperture.

2. A retainer apparatus for removably engaging a first article to a second article according to claim 1 wherein said perimeter section has a long leg emanating from said vertex and a short leg emanating from said vertex, wherein said short leg and said long leg have said acute angle relationship to one another, wherein said short leg diverges from said vertex in a direction that is equal to said bias direction and said long leg diverges from said vertex in a direction that is opposite from said bias direction to operationally further enhance said bias.

* * * * *